United States Patent
Cotdeloup et al.

(10) Patent No.: US 10,490,085 B2
(45) Date of Patent: Nov. 26, 2019

(54) METHOD AND DEVICE FOR IDENTIFICATION OF A RECIPIENT AIRCRAFT OF AN AUDIO COMMUNICATION

(71) Applicant: Airbus Operations (S.A.S.), Toulouse (FR)

(72) Inventors: Fabrice Cotdeloup, Plaisance du Touch (FR); Francois Courbun, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 107 days.

(21) Appl. No.: 15/707,744

(22) Filed: Sep. 18, 2017

(65) Prior Publication Data
US 2018/0096607 A1   Apr. 5, 2018

(30) Foreign Application Priority Data

Sep. 19, 2016   (FR) .................................. 16 58727

(51) Int. Cl.
*G10L 15/26* (2006.01)
*G08G 5/00* (2006.01)
(Continued)

(52) U.S. Cl.
CPC ......... *G08G 5/0004* (2013.01); *G06F 17/279* (2013.01); *G08G 5/0008* (2013.01);
(Continued)

(58) Field of Classification Search
None
See application file for complete search history.

(56) References Cited

U.S. PATENT DOCUMENTS 7,809,405 B1   10/2010   Rand et al.
8,515,763 B2 *  8/2013   Dong ..................... G10L 15/22
                                                      701/14
(Continued)

FOREIGN PATENT DOCUMENTS

EP   2955707 A2   12/2015

OTHER PUBLICATIONS

French Search Report for French Application No. 1658727 dated May 24, 2017.

*Primary Examiner* — Abul K Azad
(74) *Attorney, Agent, or Firm* — Jenkins, Wilson, Taylor & Hunt, P.A.

(57) ABSTRACT

A method and device for identification of a recipient aircraft of an audio communication. The device includes at least one reception unit, for example a VHF radio or an HF radio, for receiving an audio message on board the aircraft, a transcription unit for transcribing the audio message received into a text message, an analysis unit for analyzing the text message in order to extract interpretation data therefrom, a data generation assembly for determining flight data of the aircraft, a processing unit for determining discriminating data from these flight data, a comparison unit for comparing the interpretation data to the discriminating data so as to deduce therefrom whether the audio message received is indeed intended for the aircraft or not, and an indication unit for indicating to at least one crew member of the aircraft whether the aircraft is recipient or not of the audio message received.

13 Claims, 3 Drawing Sheets

(51) Int. Cl.
    *G10L 15/02*     (2006.01)
    *G10L 25/51*     (2013.01)
    *H04B 7/185*     (2006.01)
    *G06F 17/27*     (2006.01)
    *G10L 15/18*     (2013.01)
    *G10L 15/08*     (2006.01)

(52) U.S. Cl.
CPC ......... *G08G 5/0013* (2013.01); *G08G 5/0021* (2013.01); *G10L 15/02* (2013.01); *G10L 15/265* (2013.01); *G10L 25/51* (2013.01); *H04B 7/18506* (2013.01); *G10L 15/1815* (2013.01); *G10L 2015/025* (2013.01); *G10L 2015/088* (2013.01)

(56) References Cited

U.S. PATENT DOCUMENTS

| | | | |
|---|---|---|---|
| 2006/0046715 A1* | 3/2006 | Burgemeister | G08G 5/0013 455/431 |
| 2012/0054641 A1* | 3/2012 | Sae-Chim | G06F 3/0489 715/752 |
| 2014/0122070 A1 | 5/2014 | Prus et al. | |
| 2015/0081292 A1 | 3/2015 | Populus et al. | |
| 2016/0202950 A1* | 7/2016 | Hawley | G06F 16/683 700/94 |
| 2016/0284220 A1* | 9/2016 | Kar | G08G 5/0008 |

* cited by examiner

METHOD AND DEVICE FOR IDENTIFICATION OF A RECIPIENT AIRCRAFT OF AN AUDIO COMMUNICATION

CROSS-REFERENCE TO RELATED APPLICATION

This patent application claims priority to French patent application FR 16 58727, filed on Sep. 19, 2016, the entire disclosure of which is incorporated by reference herein.

TECHNICAL FIELD

The present disclosure relates to a method and a device for automatic identification of a recipient aircraft of a ground/air or air/air audio communication.

In the context of the present disclosure, the audio communication which is processed on board an aircraft can originate from an air traffic control station on the ground or from another aircraft.

Thus, more particularly, although not exclusively, the present disclosure can relate to the management on board an aircraft of audio air traffic control messages. In this case, it relates to the audio communication between air traffic control ATC on the ground and the aircraft, in particular a transport aeroplane, that is to say audio messages, transmitted by a transmitter on the ground from air traffic control and received on board the aircraft via at least one radio communication unit. An audio air traffic control message generally comprises instructions that have to be executed on the aircraft and/or information that has to be communicated to a pilot of the aircraft.

BACKGROUND

Currently, in the cockpit of an aircraft, in particular of a former commercial aircraft, the communication with air traffic control ATC stations or other aircraft is managed by one of the two members of the crew. Several communication techniques are generally available on board, namely:
- a VHF (Very High Frequency) radio, which is used for voice and/or data communications (that is to say communications transmitting data) over short distances (up to approximately 200 nautical miles), in broadcast mode;
- an HF (High Frequency) radio, which is used for voice and/or data communications over long distances, in broadcast mode; and
- a SATCOM (satellite communication) system, which is used for voice and/or data communications, in multicast mode.

The broadcast mode that the VHF and HF radios use requires constant and exhaustive listening to the communications so as to be able to identify and take account of all the relevant calls, and only those calls. Now, the diversities of the accents and of the types of speech of the calling parties, associated with the noise that is omnipresent on the radio links, often require the member of the crew responsible for communications to rely on his or her colleague to validate his or her understanding of the flight number (identifying the recipient of the message), and the content of the message itself, which can be detrimental to the efficiency of the crew for its other tasks.

Consequently, the management of audio communications on board an aircraft and in particular the verification that the aircraft is indeed recipient of an audio message received, generate a significant workload for the crew.

SUMMARY

An object of the present disclosure is to reduce the workload of the crew of an aircraft, with respect to the management of audio communications, in relation in particular to broadcast mode.

For this, the present disclosure relates to a method for identification of an aircraft as recipient aircraft of an audio communication, the method comprising:
- a reception step, implemented by a reception unit, comprising or consisting of receiving an audio message on board the aircraft; and
- a transcription step, implemented by a transcription unit, comprising or consisting of transcribing the audio message received into a text message.

According to the disclosure herein, the method also comprises:
- an analysis step, implemented by an analysis unit, comprising or consisting of analyzing the text message to extract so-called interpretation data therefrom;
- a data generation step, implemented by a data generation assembly, comprising or consisting of determining flight data of the aircraft;
- a processing step, implemented by a processing unit, comprising or consisting of determining so-called discriminating data from the flight data;
- a comparison step, implemented by a comparison unit, comprising or consisting of comparing the interpretation data to the discriminating data so as to assess (check) whether the audio message received is indeed intended for the aircraft; and
- an indication step, implemented by an indication unit, comprising or consisting of indicating to at least one crew member of the aircraft whether the aircraft is recipient or not of the audio message received.

Thus, by virtue of the disclosure herein, it is possible to determine, automatically, on board an aircraft, whether the aircraft is recipient or not of an audio message received on board the aircraft. This task does not therefore have to be performed by the crew, which makes it possible to reduce its workload.

Advantageously, the reception step comprises or consists of receiving an audio message deriving from at least one of the following communication types:
- a very high frequency radiofrequency communication;
- a high frequency radiofrequency communication.

Furthermore, advantageously, the transcription step comprises a substep of digitization and of filtering of the audio message received and a substep of transcription of the thus digitized and filtered audio message.

Moreover, advantageously, the analysis step comprises:
- a separation substep comprising or consisting of separating each word of the text message;
- a so-called local identification substep, comprising or consisting of identifying (or discriminating) phonemes; and
- a so-called global identification substep, comprising or consisting of identifying (or discriminating) terms (words, numeric values, etc.) from the identified phonemes.

Furthermore, advantageously, the analysis step comprises or consists of extracting from the text message a set of so-called key terms based on identification rules, by selecting, each time, the key term that is most probable for identified phonemes. Preferably, the identification rules comprise at least some of the following elements:
- characteristic terms comprising at least some of the following terms: a call sign of the aircraft, instructions, flight parameters;
- semantic structure rules;
- probability rules for indefinite phonemes.

Furthermore, advantageously, the data generation step comprises or consists of receiving flight data from at least one of the following systems of the aircraft:
- a flight management system;
- an air data and inertial system; and
- a collision avoidance system.

Preferably, the flight data comprise at least some of the following data of the aircraft:
- a call sign;
- a flight plan;
- an altitude;
- a position;
- a speed.

Furthermore, advantageously, the indication step comprises at least an alert generation substep.

The present disclosure also relates to a device for automatic identification of an aircraft as recipient aircraft of an audio communication, originating from an air traffic control station or from another aircraft, the device comprising:
- at least one reception unit configured to receive an audio message on board the aircraft; and
- a transcription unit configured to transcribe the audio message received into a text message.

According to the disclosure herein, the device also comprises:
- an analysis unit configured to analyze the text message in order to extract so-called interpretation data therefrom;
- a data generation assembly configured to determine flight data of the aircraft;
- a processing unit configured to determine so-called discriminating data from the flight data;
- a comparison unit configured to compare interpretation data to the discriminating data so as to deduce therefrom whether the audio message received is indeed intended for the aircraft; and
- an indication unit configured to indicate to at least one crew member of the aircraft whether the aircraft is recipient or not of the audio message received.

In a preferred embodiment, the analysis unit comprises:
- a slicing unit configured to separate each word of the text message;
- a local identification unit, configured to identify phonemes;
- a global identification unit, configured to identify terms from the identified phonemes.

Moreover, advantageously:
- the indication unit comprises at least an alert generation unit; and/or
- the identification device comprises, in addition, a recording unit configured to record the audio message received and an audio transmission unit, that can be activated by a crew member of the aircraft and configured to transmit the recorded audio message when it is activated.

The present disclosure also relates to an aircraft, in particular a transport aeroplane, which is provided with a device for identification of a recipient aircraft of an audio communication, such as that specified hereinabove.

BRIEF DESCRIPTION OF THE DRAWINGS

The attached figures will give a good understanding of how the disclosure herein can be produced. In these figures, identical references denote similar elements. More particularly.

DETAILED DESCRIPTION

Figure 1:
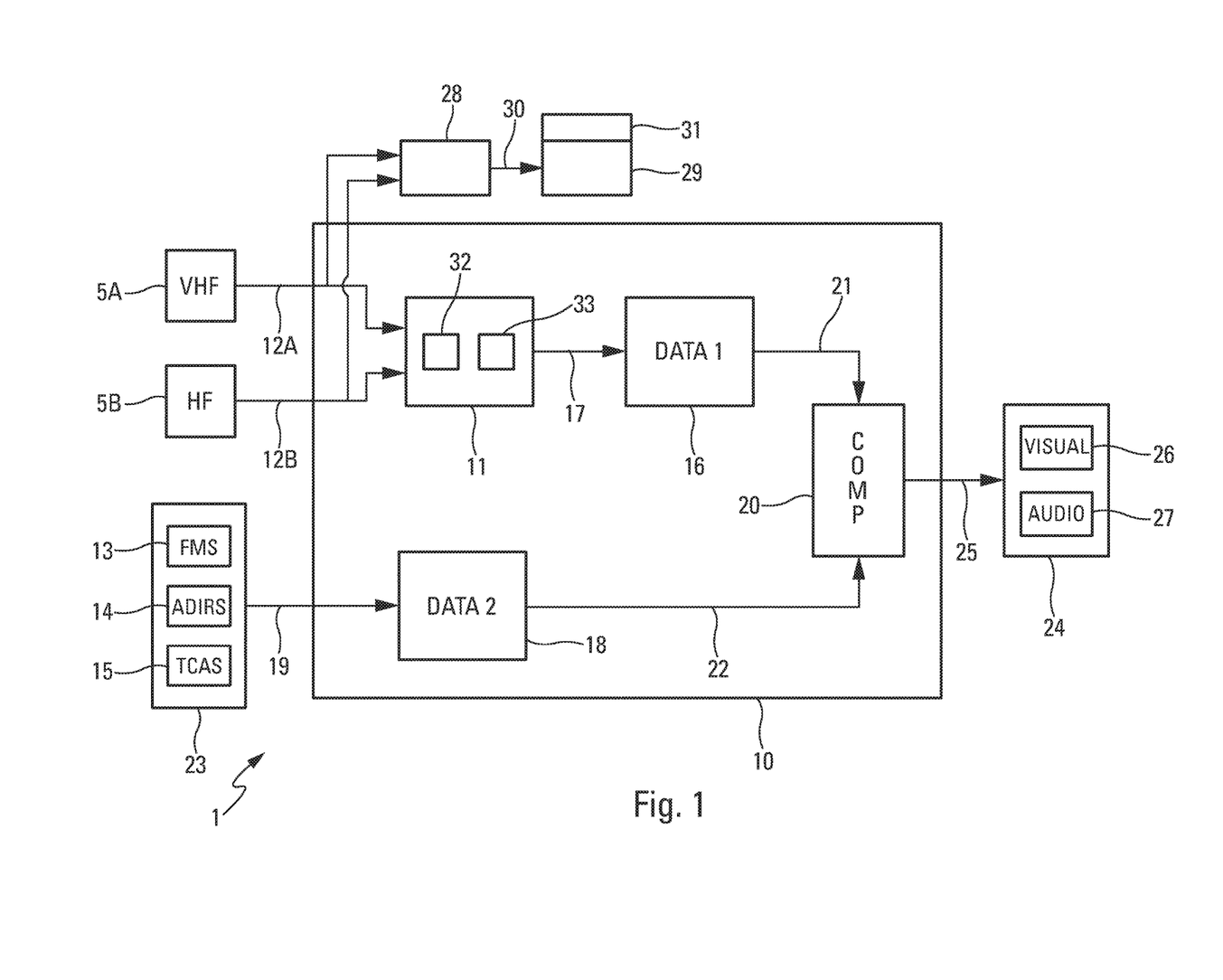
FIG. 1 is a block diagram of a particular embodiment of a device for automatic identification of a recipient aircraft of an audio message.

The device 1 illustrating an embodiment of the disclosure herein and represented schematically in FIG. 1 is intended for the automatic on board management of an aircraft AC, in particular of a transport aeroplane, of audio messages, in particular audio air traffic control messages of ATC ("Air Traffic Control") type. More specifically, the object of the device 1 is to check whether the aircraft, on which it is installed, is indeed the recipient aircraft of a received audio communication originating from an air traffic control station or from another aircraft.

Figure 2:
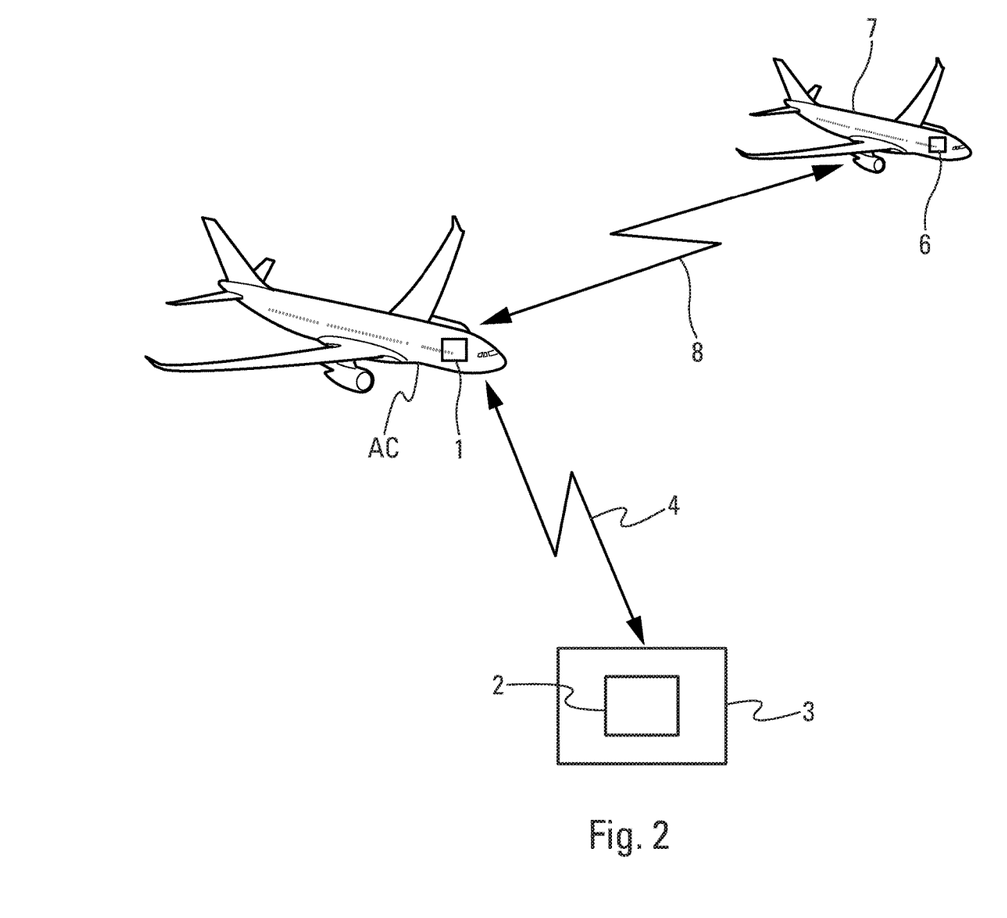
FIG. 2 schematically shows an aircraft to which the present disclosure can be applied.

Usually, as represented schematically in FIG. 2, the audio air traffic control messages are generated and transmitted by a transmitter 2 of an air traffic control station 3 installed on the ground at a particular transmission frequency. These messages are transmitted via electromagnetic waves, as illustrated schematically by an arrow 4 in FIG. 2, and are received on board the aircraft AC, via a standard radio (or radio communication unit) 5A, 5B (FIG. 1) set to this transmission frequency. Generally, an audio air traffic control message comprises instructions that have to be executed on the aircraft AC and/or information that has to be communicated to a pilot of the aircraft AC.

The audio messages taken into account in the context of the present disclosure can also be generated and transmitted by a transmitter 6 mounted on an aircraft 7, other than the aircraft AC, at a particular transmission frequency. These messages are transmitted via electromagnetic waves, as illustrated schematically by an arrow 8 in FIG. 2, and are received on board the aircraft AC, via a radio 5A, 5B set to this transmission frequency.

As represented in FIG. 1, the device 1 therefore comprises at least one reception unit configured to receive an audio message on board the aircraft. It can notably be:
- a radio 5A of VHF (Very High Frequency) type, which is used, in the usual way, for voice and/or data communications over short distances (up to approximately 200 nautical miles), in broadcast mode;
- a radio 5B of HF (High Frequency) type, which is used, in the usual way, for voice and/or data communications over long distances, also in broadcast mode.

The device 1 comprises a central unit 10 which comprises a transcription unit 11. This transcription unit 11 comprises a voice recognition engine and is configured to transcribe, into a text message, an audio message received from the VHF radio 5A via a link 12A or from the HF radio 5B via a link 12B.

According to the disclosure herein, the device 1 also comprises at least one data generation assembly 23 configured to determine (or generate) flight data of the aircraft. The data generation assembly 23 preferably comprises at least:

a flight management system 13, of FMS (Flight Management System) type;

an air data and inertial reference system 14, of ADIRS (Air Data and Inertial Reference System) type; and a collision avoidance system 15, of TCAS (Traffic Collision Avoidance System) type.

As specified hereinbelow, the flight data supplied by the data generation assembly 23 comprise at least some of the following data of the aircraft:

its call sign;
its flight plan;
its altitude;
its position;
at least one of its speeds (vertical, ground, etc.).

In addition, according to the disclosure herein, the device 1 also comprises, as represented in FIG. 1:

an analysis unit 16 which is linked via a link 17 to the transcription unit 11 and which is configured to analyze the text message received from the transcription unit 11 via the link 17, in order to extract so-called interpretation data ("DATA 1") therefrom;

a processing unit 18 which is linked via a link 19 to the data generation assembly 23 and which is configured to determine so-called discriminating data ("DATA 2"), from the flight data received from the data generation assembly 23 via the link 19;

a comparison unit 20 ("COMP") which is linked via links 21 and 22, respectively, to the analysis unit 16 and to the processing unit 18 and which is configured to compare the interpretation data (received from the analysis unit 16 via the link 21) to the discriminating data (received from the processing unit 18 via the link 22) so as to deduce therefrom whether the audio message received is indeed intended for the aircraft AC equipped with the device 1; and an indication unit 24 which is linked via a link 25 to the comparison unit 20 and which is configured to indicate, to at least one crew member of the aircraft, at least whether the aircraft is recipient or not of the audio message received.

The indication unit 24 comprises, preferably:
a visual alert generation unit 26 ("VISUAL"); and
an audio alert generation unit 27 ("AUDIO").

In addition, the analysis unit 16, the processing unit 18 and the comparison unit 20 form part of the central unit 10.

In case of positive discrimination (that is to say when the comparison unit 20 concludes that the aircraft equipped with the device 1 is indeed the recipient aircraft of the message analyzed), the results from the comparison unit 20 also contain the sentence decoded by the device 1 (that is to say the message intended for the aircraft as transmitted).

The device 1 thus assists in identifying a recipient aircraft in the broadcasting of a (audio) radio communication of ground/air or air/air type.

As specified hereinbelow, the device 1 implements, to this end, a multicriteria discrimination making it possible to identify the most probable recipient of a broadcast radio communication, out of a set of aircraft moving within a common airspace, defined by the capacity to receive the audio message transmitted.

In a preferred embodiment, the device 1 also comprises:

a recording unit 28 configured to record an audio message received from the VHF radio 5A via the link 12A or from the HF radio 5B via the link 12B; and an audio transmission unit 29 linked via a link 30 to the recording unit 28. This audio transmission unit 29 can be activated by a crew member of the aircraft via an activation element 31 (knob, touch-sensitive element, etc.) and is configured to transmit, in the cockpit of the aircraft, the recorded audio message, when it is activated.

The device 1 thus makes it possible to reduce the workload of the crew members by filtering the HF/VHF calls received and by making only those calls (audio messages) reach them which are actually intended for them.

Various units of the device 1 are described hereinbelow in more detail.

In a preferred embodiment, the transcription unit 11 comprises, as represented in FIG. 1:

an element 32 for digitizing and filtering the audio message received; and an element 33 for transcribing the thus digitized and filtered audio message.

Figure 3:
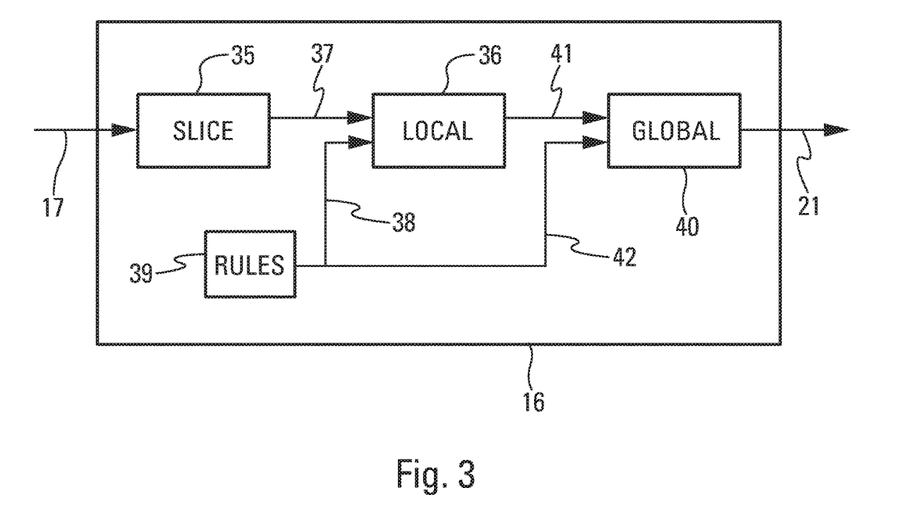
FIGS. 3 and 4 are the block diagrams of units forming part of the device of FIG. 1.

Moreover, in a preferred embodiment, the analysis unit 16 which is intended to extract from the text message a set of so-called key terms (words, numbers, etc.) based on identification rules, comprises, as represented in FIG. 3:

a slicing unit 35 ("SLICE") which is linked via the link 17 to the transcription assembly 11 and which is configured to separate each word of the text message;

a local identification unit 36 ("LOCAL") which is linked via links 37 and 38, respectively, to the slicing unit 35 and to a management unit 39 defining identification rules ("RULES"), specified hereinbelow, this local identification unit 36 being configured to identify phonemes; and a global identification unit 40 ("GLOBAL") which is linked via links 41 and 42, respectively, to the local identification unit 36 and to the database 39, this global identification unit 40 being configured to identify terms (words, numeric values, etc.) from the phonemes identified by the local identification unit 36.

The management unit 39 contains or receives a set of identification rules. Preferably, the identification rules comprise at least some of the following elements:

characteristic terms (by categories) comprising at least some of the following terms:

a name of the airline (for example "AF", "DAH", "BAW", etc.), to which the aircraft belongs when it is an airliner;

instructions (or commands), for example "maintain altitude", "descend", "reduce speed", "rotate", etc.;

flight parameters ("right", "left", numeric values, etc.); and so on;

strong semantic models defining rules such as:

a call sign (or flight number) is structured as being defined by an ICAO definition;

a call sign must be followed by an instruction;

the "climb" instruction must be followed by the "maintain" altitude or flight level instruction, or by an altitude;

the "rotate" instruction must be followed by "right" or "left";

the term "right" or "left" must be followed by a heading;

the "descend" instruction must be followed by the "maintain" altitude or flight level instruction, or by a numeric value;

and so on;

typical probability rules for undefined phonemes, such as:

if an undefined phoneme is followed by an instruction, it has a 70% probability of forming part of a call sign, 29% probability of forming part of an instruction and 1% probability of forming part of a parameter;

if an undefined phoneme is preceded by no phoneme, it has a 90% probability of forming part of a call sign, 9% probability of forming part of an instruction and 1% probability of forming part of a parameter;

if an undefined phoneme is preceded by (or followed by) numeric values, it has a 98% probability of forming part of a numeric value and 2% probability of forming part of an instruction.

From this set of identification rules, the management unit 39 determines local identification rules and global identification rules.

The local identification rules which are used to identify phonemes are transmitted to the local identification unit 36, and the global identification rules which are used to identify key terms are transmitted to the global identification unit 40.

The local identification unit 36 is configured to identify (or discriminate) phonemes from at least one set of words received from the slicing unit 35, by using the local identification rules applied to each of the words which are analyzed individually.

Furthermore, the global identification unit 41 is configured to identify (or discriminate) so-called key terms (words, numeric values, etc.) from the phonemes received from the local identification unit 36, by using global identification rules and by selecting, each time, the key term that is most probable for the phoneme concerned as a function of the context (that is to say of the more global situation).

The global identification unit 41 thus transmits as output from the analysis unit 16, via the link 21, a set of key terms representing the interpretation data.

Moreover, the processing unit 18 is configured to determine discriminating data, from the flight data received from the data generation assembly 23, by formatting them so they are able to be used.

For this, the processing unit 18 uses at least some of the following data relating to the aircraft:
data received from the flight management system 13:
  the call sign (flight identification);
  the flight plan and the associated way points;
data received from the air data and inertial reference system 14:
  the altitude;
  the position;
  the air speed;
  the ground speed;
  the vertical speed;
data received from the collision avoidance system 15:
  the call sign;
  the altitude;
  the position;
  the air speed;
  the ground speed;
  the vertical speed.

Figure 4:
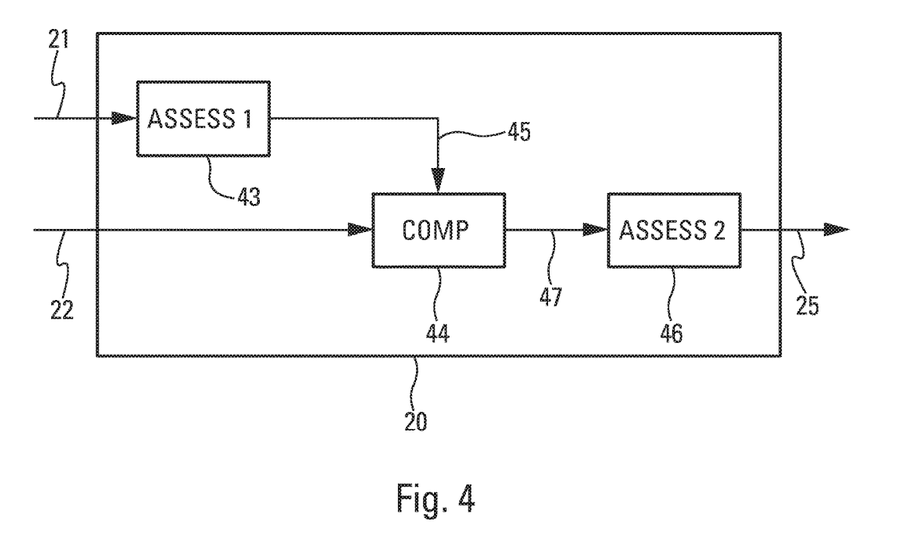

Moreover, in a preferred embodiment, the comparison unit 20 which is intended to assess (check) whether the aircraft is indeed recipient of the message, comprises, as represented in FIG. 4:
an assessment unit 43 ("ASSESS 1") which is linked via the link 21 to the analysis unit 16 and which is configured to check whether the information received from the analysis unit 16 is sufficiently complete to be able to be subjected to a comparison;
a comparison element 44 ("COMP") which is linked via links 45 and 22, respectively, to the assessment unit 43 and to the processing unit 18, which also receives identification rules, and which is configured to compare the interpretation data to the discriminating data so as to deduce therefrom whether the audio message received is intended or not for the aircraft AC (FIG. 1) equipped with the device 1; and
an assessment unit 46 ("ASSESS 2") which is linked via a link 47 to the comparison element 44 and which is configured to check whether the result of the comparison is consistent.

Moreover:
the visual alert generation unit 26 transmits, if appropriate, a visual signal on a screen or any other visual indicator (light indicator, for example), arranged in the cockpit of the aircraft, to inform the crew members that their aircraft is recipient of an audio message. The unit 26 can also present the content of the message in text form, in the case where this message is intended for the aircraft; and
the audio alert generation unit 27 transmits, if appropriate, an audio signal in the cockpit of the aircraft, to inform the crew members that their aircraft is recipient of an audio message.

The crew can then listen to the audio message by activating, via the activation element 31 (FIG. 1), the audio transmission unit 29 which is configured to transmit the pre-recorded audio message when it is activated.

The operation of the device 1 is described hereinbelow using a particular example.

In this example, it is considered that the aircraft AC equipped with the device 1 comprises the following call sign (or identifier): AF782BM. The aircraft moves around within an airspace including at least one other aircraft, such as the aircraft 7 of FIG. 2, whose call sign is AF795JZ.

The following information is considered for these two aircraft:
for the aircraft AF795JZ:
  altitude: 7000 ft (feet);
  vertical speed: zero;
  speed: 280 kt (knots);
  route: 80°;
  latitude: 43.6248;
  longitude: 1.3746;
  "Squawk" signal: 1000;
for the aircraft AF782BM:
  altitude: 3000 ft (feet);
  vertical speed: zero;
  speed: 250 kt (knots);
  route: 175°;
  latitude: 43.5948;
  longitude: 1.5446;
  "Squawk" signal: 1000.

The following VHF radio communication is transmitted by air traffic control from the control station 3 (FIG. 2): "Air France seven eight two Bravo Mike, climb and maintain five thousand". In other words, the aircraft AC must climb to 5000 feet and remain at that altitude.

This radio communication is therefore actually addressed to the aircraft AC equipped with the device 1. However, since the VHF radio communication used operates in broadcast mode, all the crews of the aircraft in proximity hear the message and must check whether the identifier of the recipient corresponds to their own so as to determine whether the communication is actually addressed to them.

The device 1, as described above, of the aircraft AC will seek to identify the flight number of the recipient aircraft, and certain instructions contained in the audio message.

To do this, the device 1 (FIG. 1) implements the following steps A/ to F/:
A/ reception of the radio message by the radio 5A.

The radio signal is converted into an audio message and sent to the central unit 10 for voice identification;

B/analysis of the message by voice recognition, using a voice recognition engine forming part of the device 1.

It is assumed the following text message: "Airfra . . . sevn . . . claimb . . . five thou . . . " is obtained at the output of the transcription unit 11. Since this interpretation is partial, it does not a priori make it possible to identify the recipient of the message, or its exact content;

C/highlighting of the useable data.

The device 1 seeks to extract the data that can be interpreted formally. For this, the message is chopped (using the slicing unit 35 of the analysis unit 16), then characterized locally, piecewise (using the local identification unit 36), and finally characterized as a whole (using the global identification unit 40), and this is done as follows:

chopping of the message to obtain ["Airfra"+"seven"+"claimb"+"five"+"thou"];

local characterization (using the local identification unit 36) associating a probable key term with a phoneme:

| Phoneme → | Probable associated key term (word, value, etc.): | |
|---|---|---|
| Airfr → | AF (Air France) | (with a 75% probability), |
| → | Alpha | (with a 23% probability), |
| → | . . . | (with an x % probability), |
| sevn → | 7 | (with a 90% probability), |
| → | descent | (with a 5% probability), |
| → | . . . | (with an x % probability), |
| claimb→ | climb | (with an 85% probability), |
| → | Mike | (with a 2% probability), |
| → | . . . | (with an x % probability), |
| five → | five | (with a 99% probability), |
| → | climb | (with a 1% probability), |
| thou → | south | (with a 53% probability), |
| → | thousand | (with a 45% probability), |
| → | . . . | (with an x % probability); | global characterization. By using a lexical base as a basis, the global identification unit 40 determines the most probable choices as a function of the global context established, namely:

the key terms "AF", "7" and "five" are retained because of their very strong respective local probabilities;

the key term "climb" is recognized as climb instructions through its high local probability of occurrence. Since this instruction originating from air traffic control is almost always followed by an altitude (and not a heading) as the identification rules stipulate, the key term "south" is discarded in favour of the key term "thousand" despite the result of the simple local probabilistic analysis.

The message obtained from these steps is therefore:

"AF7 climb five thousand"

This message still does not make it possible to identify the recipient of the message;

D/comparison of useful (interpretation) data received to the discriminating data:

For this, the following are used:

the discriminating data obtained from the flight management system 13 (FMS), namely the ICAO identifier (call sign). The flight management system 13 has an ICAO identifier input by one of the members of the crew during flight preparation. This identifier is stated by air traffic control to designate the recipient of the radio communications in broadcast mode;

the discriminating data obtained from the collision avoidance system 15 (TCAS). The collision avoidance system is provided with an ADS-B function that allows the aircraft to know certain information on the aircraft moving within a common air parameter (within VHF communication range in the example considered), and in particular:

the ICAO identifier;
the altitude;
the position;
the relative wind speed;
the ground speed;
the vertical speed;

the discriminating data obtained from the air data and inertial reference system 14 (ADIRS), such as:

the altitude;
the position;
the relative wind speed;
the ground speed;
the vertical speed.

Given the availability of this information, an example of comparison process is provided hereinbelow:

Comparison of the ICAO identifiers. Since the identifier extracted from the useable data is incomplete, it will be compared to the ICAO identifier of the current flight, and to the identifiers of the flights in proximity so as to determine the most probable recipient. In the example considered, two flight numbers emerge from the batch: AF782BM and AF795JZ, since their first characters correspond to the number extracted from the useable data. It is therefore very probable that one of these numbers is the expected recipient. Now, since their probabilities of occurrence are not sufficiently far from one another, a comparison implementing other information is necessary to decide between them;

Comparison of the altitudes. With the useable data including a climb command, it is advantageous to compare the altitudes of the two flights to the air traffic control instruction. In the example considered, the ADS-B data of the flight AF795JZ indicate an altitude of 7000 feet, whereas the aircraft AF 782BM is moving at an altitude of 3000 feet, as indicated by its inertial reference system. This comparison is sufficiently discriminating to establish the final result. In fact, it seems highly improbable that air traffic control is asking an aircraft moving at a certain altitude (7000 feet for the aircraft AF795JZ) to climb to a lower altitude (5000 feet). The recipient aircraft is therefore the aircraft AF782BM;

E/formatting of the results. The message is formatted to be able to be presented to the crew in text form; and F/presentation of the recipient of the message to the crew.

The device 1 alerts the crew via the indication unit 24 that it is the probable recipient of the audio message, by transmitting an audio and visual alert, and by presenting the content of the decoded message to it in text form.

The device 1, as described above, makes it possible to significantly reduce the workload required to monitor and decode radio communications, particularly during approach phases or when flying over dense zones. The dense zones are characterized by a high number of radio interchanges between the control centres and the surrounding aircraft, these interchanges being received by all the aircraft operating in the same zone (within a radius of approximately 200 nautical miles for a VHF communication, which is more often than not used).

The crew of the aircraft AC can then concentrate on its main tasks, of piloting and navigation in particular. This assistance is even more useful when an additional workload has to be managed by the crew (change of weather, system failure(s), TCAS alert, etc.).

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatic identification of an aircraft as recipient aircraft of an audio communication, the method comprising:
    a reception step, implemented by a reception unit, comprising receiving an audio message on board the aircraft;
    a transcription step, implemented by a transcription unit, comprising transcribing the audio message received into a text message;
    an analysis step, implemented by an analysis unit, comprising analyzing the text message to extract interpretation data therefrom;
    a data generation step, implemented by a data generation assembly, comprising determining flight data of the aircraft;
    a processing step, implemented by a processing unit, comprising determining discriminating data from the flight data;
    a comparison step, implemented by a comparison unit, comprising comparing the interpretation data to the discriminating data to assess whether the audio message received is indeed intended for the aircraft; and
    an indication step, implemented by an indication unit, comprising indicating to at least one crew member of the aircraft whether the aircraft is recipient or not of the audio message received;
    wherein the analysis step comprises extracting from the text message a set of key terms based on identification rules, by selecting, each time, a key term that is most probable for identified phonemes.

2. The method according to claim 1, wherein the reception step comprises receiving an audio message deriving from at least one of the following communication types:
    a very high frequency radiofrequency communication;
    a high frequency radiofrequency communication.

3. The method according to claim 1, wherein the transcription step comprises a substep of digitization and of filtering of the audio message received and a substep of transcription of the thus digitized and filtered audio message.

4. The method according to claim 1, wherein the analysis step comprises:
    a separation substep comprising separating each word of the text message;
    a local identification substep, comprising identifying phonemes; and
    a global identification substep, comprising identifying terms from the identified phonemes.

5. The method according to claim 1, wherein the identification rules comprise at least some of the following elements:
    characteristic terms comprising at least some of the following terms: a call sign of the aircraft, instructions, flight parameters;
    semantic structure rules;
    probability rules for indefinite phonemes.

6. The method according to claim 1, wherein the data generation step comprises receiving flight data from at least one of the following systems of the aircraft:
    a flight management system;
    an air data and inertial reference system; and
    a collision avoidance system.

7. The method according to claim 6, wherein the flight data comprise at least some of the following data of the aircraft:
    a call sign;
    a flight plan;
    an altitude;
    a position;
    a speed.

8. The method according to claim 1, wherein the indication step comprises at least an alert generation substep.

9. A device for automatic identification of an aircraft as recipient aircraft of an audio communication, the device comprising:
    at least one reception unit configured to receive an audio message on board the aircraft;
    a transcription unit configured to transcribe the audio message received into a text message;
    an analysis unit configured to analyze the text message in order to extract interpretation data therefrom;
    a data generation assembly configured to determine flight data of the aircraft;
    a processing unit configured to determine discriminating data from the flight data;
    a comparison unit configured to compare the interpretation data to the discriminating data to assess whether the audio message received is indeed intended for the aircraft; and
    an indication unit configured to indicate to at least one crew member of the aircraft whether the aircraft is recipient or not of the audio message received;
    wherein the analysis unit is further configured to extract from the text message a set of key terms based on identification rules, and select, each time, a key term that is most probable for identified phonemes.

10. The device according to claim 9, wherein the analysis unit comprises:
   a slicing unit configured to separate each word of the text message;
   a local identification unit configured to identify phonemes; and
   a global identification unit configured to identify terms from the identified phonemes.

11. The device according to claim 10, wherein the indication unit comprises at least an alert generation unit.

12. The device according to claim 9, comprising a recording unit configured to record the audio message received and an audio transmission unit, that can be activated by a crew member of the aircraft and configured to transmit the recorded audio message when it is activated.

13. An aircraft comprising a device for automatic identification of an aircraft as recipient aircraft of an audio communication, the device comprising:
   at least one reception unit configured to receive an audio message on board the aircraft; and
   a transcription unit configured to transcribe the audio message received into a text message;
   an analysis unit configured to analyze the text message in order to extract interpretation data therefrom;
   a data generation assembly configured to determine flight data of the aircraft;
   a processing unit configured to determine discriminating data from the flight data;
   a comparison unit configured to compare the interpretation data to the discriminating data to assess whether the audio message received is indeed intended for the aircraft; and
   an indication unit configured to indicate to at least one crew member of the aircraft whether the aircraft is recipient or not of the audio message received;
   wherein the analysis unit is further configured to extract from the text message a set of key terms based on identification rules, and select, each time, a key term that is most probable for identified phonemes.

* * * * *